(12) United States Patent
Lenaerts et al.

(10) Patent No.: US 11,260,687 B2
(45) Date of Patent: Mar. 1, 2022

(54) DECORATING NATURAL LEATHER

(71) Applicant: AGFA NV, Mortsel (BE)

(72) Inventors: Jens Lenaerts, Mortsel (BE); Pantelis Yiannakou, Mortsel (BE); Tom Cloots, Mortsel (BE); Dieter Jancart, Mortsel (BE)

(73) Assignee: AGFA NV, Mortsei (BE)

( * ) Notice: Subject to any disclaimer, the term of this patent is extended or adjusted under 35 U.S.C. 154(b) by 151 days.

(21) Appl. No.: 16/604,586

(22) PCT Filed: Apr. 6, 2018

(86) PCT No.: PCT/EP2018/058834
§ 371 (c)(1),
(2) Date: Oct. 11, 2019

(87) PCT Pub. No.: WO2018/189044
PCT Pub. Date: Oct. 18, 2018

(65) Prior Publication Data
US 2021/0187991 A1    Jun. 24, 2021

(30) Foreign Application Priority Data
Apr. 14, 2017   (EP) ..................... 17166685

(51) Int. Cl.
*B41M 5/00*   (2006.01)
*B41J 2/21*   (2006.01)
(Continued)

(52) U.S. Cl.
CPC .......... *B41M 5/0076* (2013.01); *B41J 2/2107* (2013.01); *B41J 11/00* (2013.01);
(Continued)

(58) Field of Classification Search
CPC ... C09D 11/107; C09D 11/322; C09D 11/101; C09D 11/326; C09D 11/38;
(Continued)

(56) References Cited

U.S. PATENT DOCUMENTS 2,194,610 A   3/1940   Orthmann et al.
3,892,523 A   7/1975   Redlich et al.
(Continued)

FOREIGN PATENT DOCUMENTS

GB   111304 A   11/1917
GB   565969 A   12/1944
(Continued)

OTHER PUBLICATIONS

Office Action dated Oct. 28, 2020 relating to Japanese Patent Application No. 2019-555797 (English translation included), 15 pages.
(Continued)

*Primary Examiner* — Manish S Shah
(74) *Attorney, Agent, or Firm* — Leydig, Voit & Mayer, Ltd.

(57) ABSTRACT

A manufacturing method for decorating natural leather with a decorative image includes applying on a crusted leather a base coat containing a pigment for providing a chromatic colour or an achromatic colour different from black, inkjet printing a colour image on the base coat using one or more pigmented UV curable inkjet inks, optionally applying a protective top coat on the image, and optionally applying a heat pressing or embossing step, wherein the chromatic colour or the achromatic colour different from black of the base coat and the inkjet printed colour image are used in combination to provide the decorative image.

11 Claims, 3 Drawing Sheets

(51) Int. Cl.

| | | |
|---|---|---|
| *B41J 11/00* | (2006.01) | |
| *C09D 11/033* | (2014.01) | |
| *C09D 11/037* | (2014.01) | |
| *C09D 11/101* | (2014.01) | |
| *C09D 11/102* | (2014.01) | |
| *C09D 11/322* | (2014.01) | |
| *C09D 151/08* | (2006.01) | |
| *C14C 11/00* | (2006.01) | |
| *B41J 2/01* | (2006.01) | |

(52) U.S. Cl.
CPC .......... *B41J 11/002* (2013.01); *B41M 5/0047* (2013.01); *C09D 11/033* (2013.01); *C09D 11/037* (2013.01); *C09D 11/101* (2013.01); *C09D 11/102* (2013.01); *C09D 11/322* (2013.01); *C09D 151/08* (2013.01); *C14C 11/006* (2013.01); *B41J 2/01* (2013.01)

(58) Field of Classification Search
CPC ... C09D 11/033; C09D 11/102; C09D 11/037; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/00; B41M 5/0023; B41M 7/0081; B41M 3/006; B41M 3/003; B41M 5/0011; B41M 5/0017; B41M 7/00; B41M 7/0072; B41M 5/52; B41M 5/5218; B41M 5/5227; B41M 5/0076; B41M 5/0047; G02B 5/20; G02B 5/223; C08K 2003/2237; C08K 3/11; C14C 11/006
See application file for complete search history.

(56) References Cited

U.S. PATENT DOCUMENTS

| | | | | | |
|---|---|---|---|---|---|
| 5,676,707 | A | * | 10/1997 | Kuwabara | ............ D06P 1/0004 8/436 |
| 2008/0008864 | A1 | * | 1/2008 | Itoh | ........................ B41M 5/502 428/195.1 |
| 2010/0233441 | A1 | * | 9/2010 | Kubota | ................ B41M 5/0076 428/195.1 |
| 2013/0239833 | A1 | * | 9/2013 | Yiannakou | ........... B41M 5/0047 101/487 |
| 2016/0067984 | A1 | | 3/2016 | Chung | |

FOREIGN PATENT DOCUMENTS

| | | | |
|---|---|---|---|
| GB | 2510696 | A | 8/2014 |
| GB | 2511606 | A | 9/2014 |
| GB | 2540011 | A | 1/2017 |
| JP | 2010-185055 | A | 8/2010 |
| JP | 2014-055210 | A | 3/2014 |
| WO | 01/32434 | A1 | 5/2001 |
| WO | 2008/044515 | A1 | 4/2008 |
| WO | 2013/135828 | A1 | 9/2013 |

OTHER PUBLICATIONS

Official Communication issued in International Patent Application No. PCT/EP2018/058834, dated Jun. 11, 2018.

* cited by examiner

ID ECORATING NATURAL LEATHER

CROSS REFERENCE TO RELATED APPLICATIONS

This application is a 371 National Stage Application of PCT/EP2018/058834, filed Apr. 6, 2018. This application claims the benefit of European Application No. 17166685.2, filed Apr. 14, 2017, which is incorporated by reference herein in its entirety.

BACKGROUND OF THE INVENTION

1. Field of the Invention

The present invention relates to the manufacturing of decorated natural leather and leather articles therewith.

2. Description of the Related Art

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Leather by itself is already perceived as a luxury product, but personalization and customization, for example by decoration, can further enhance this luxury feel. Natural leather has been decorated in the past by screen printing. However, screen printing is labour intensive and a large number of individual screens are required for each colour and for each size of print. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO 01/32434 A (GILHAM) and US 2016067984 A (CHUNG). Aspects such as image quality, light fading of transferred dyes and scratch resistance need further improvement.

Light fading of dyes can be resolved by using pigmented inks. GB 2510696 A (SERICOL) discloses a method of printing onto a leather or synthetic leather substrate by depositing a primer layer onto the substrate, the primer comprising a thermoplastic resin and water; at least partially drying and/or curing the primer; inkjet printing a pigmented hybrid solvent/radiation curable ink onto the primer layer; drying and curing the hybrid ink layer.

Recently high quality decorated leather has been obtained by a method of printing "into" tanned leather with pigmented inks. WO 2013/135828 (CODUS) discloses a method of printing into tanned leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

A high image quality of printed leather is essential for luxury leather articles. In order to enhance colour brilliancy, often a white background is used.

One option is to use white leather. The manufacturing of white leather has been known for a long time and can be accomplished by bleaching, see e.g. GB 565969 A (LEINER) and US 3892523 (ROHM AND HAAS), and incorporating white pigments and salts into the skins or hides, see e.g. U.S. Pat. No. 2,194,610 (VANDERBILT) and GB 111304 A (BLATZ).

However, the luxury appearance of a leather article is substantially decreased when a side of the printed white leather is viewable in the leather article or when perforations are present, for example for sewing leather pieces together or for providing aeration in e.g. leather car seats. The latter is illustrated by FIG. 2 showing an inkjet printed leather (21) having a decorative image (22) and a background image (23) where the white colour of the leather is clearly visible on a side (24) or in a perforation (25). Furthermore, the use of white leather generally does not help much to reduce colour inconsistencies or surface defects, like scratch marks of barbed wire, that are commonly found on the surface of a natural leather.

Another option for providing a white background is to use white inkjet inks, as also suggested by the above-mentioned WO 2013/135828 (CODUS) in FIG. 4 and by GB 2510696 A (SERICOL) on page 13, lines 12 and 35. However, it was observed that the application of white inkjet ink in amounts sufficient to mask surface defects and colour inconsistencies of the leather resulted in insufficient flexibility of the printed leather showing cracks in the printed image. The latter was also confirmed by GB 2510696 A (SERICOL) on page 1, lines 26 to 34, which suggested the use of hybrid solvent/radiation curable inks in combination with a partially dried and cured primer layer containing a thermoplastic resin. However, by using radiation curable inks containing substantial amounts of solvent, the image quality deteriorates as bleeding occurs and effective UV pinning is delayed due to the presence of the organic solvents. Furthermore, when high levels of organic solvents are employed, such solvents tend to evaporate at the nozzles of an inkjet print head during a prolonged non-printing time resulting in so-called failing nozzles (clogged). Reliability of an inkjet printing process is of high economic importance in a manufacturing environment.

Hence, there is a need for manufacturing methods of decorated leather having high image quality and colour consistency, while not sacrificing inkjet printing reliability or physical properties like flexibility.

SUMMARY OF THE INVENTION

In order to overcome the problems described above, preferred embodiments of the present invention have been realised with a manufacturing method for decorating natural leather as described below.

It was surprisingly found that an inkjet printed leather exhibiting excellent flexibility, colour consistency and image quality by using a chromatic colour or an achromatic colour different from black in a base coat (44) on a crusted leather (45) and combining it with an colour image (43) inkjet printed on the base coat for providing a decorative image to a natural leather. The word 'combining' is to be understood as that the colours in the decorative image are the result from the colours of the colour image and the colour of the base coat.

These and other objects of the present invention will become apparent from the detailed description hereinafter.

DETAILED DESCRIPTION OF THE PREFERRED EMBODIMENTS

Definitions

Figure 1:
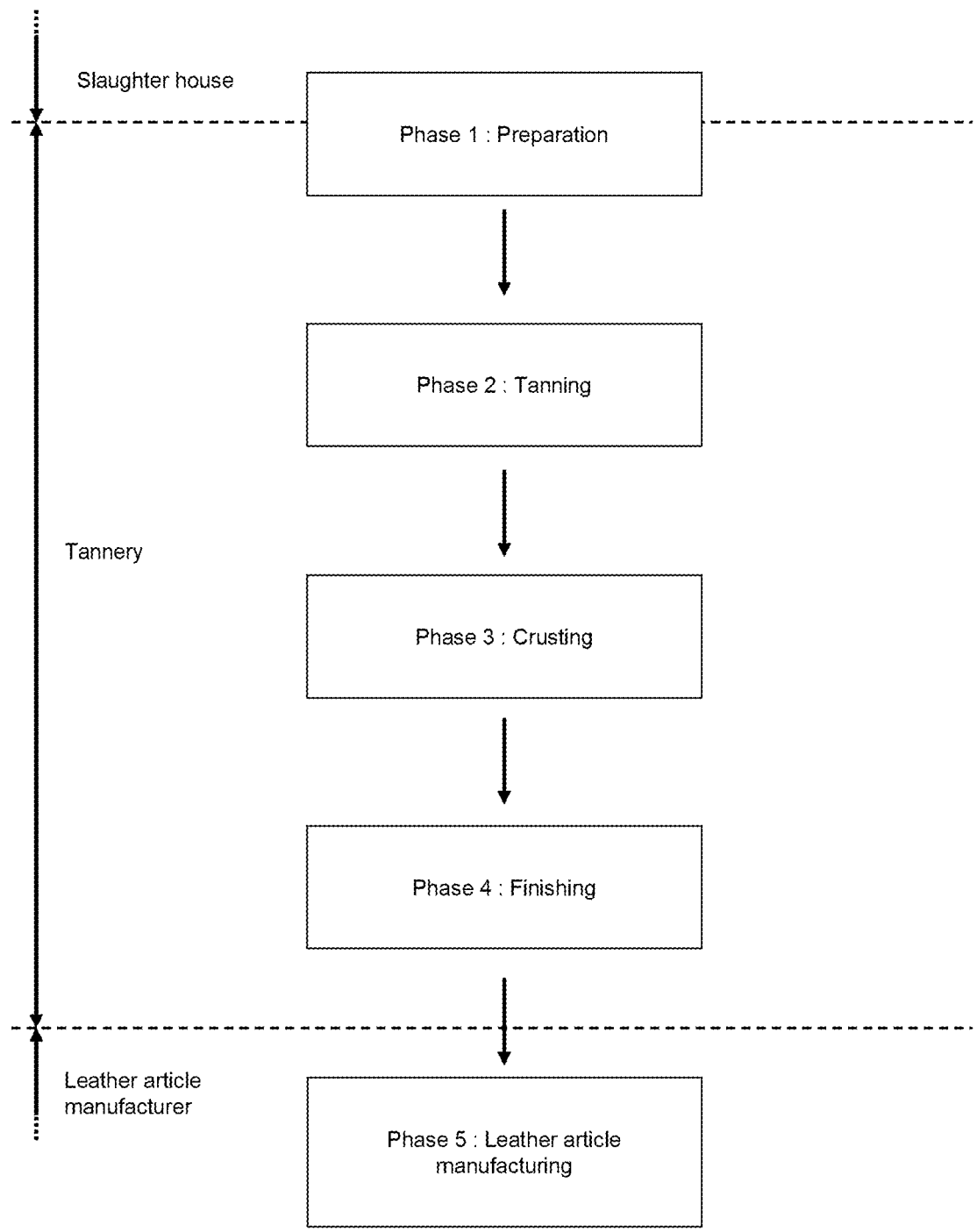
FIG. 1 shows a flow chart of the traditional manufacturing of leather articles involving the different phases and locations.

The term "crusted leather" or "crust leather" means leather that has been tanned and crusted, but not finished.

The term "monofunctional", as used in monofunctional monomers and oligomers, means containing a single polymerizable group.

The term "polyfunctional", as used in monofunctional monomers and oligomers, means containing a two, three or more polymerizable groups.

The term "oligomer" means a compound polymerized from 2 to 50 monomers.

Manufacturing Methods for Decorating Natural Leather

A manufacturing method for decorating natural leather with a decorative image according to a preferred embodiment of the present invention includes the steps of: applying on a crusted leather (45) a base coat (44) containing a pigment for providing a chromatic colour or an achromatic colour different from black; inkjet printing a colour image (43) on the base coat (44) using one or more pigmented UV curable inkjet inks; optionally applying a protective top coat (42) on the image (43); and optionally applying a heat pressing or embossing step; wherein the chromatic colour or the achromatic colour different from black of the base coat and the inkjet printed colour image are used in combination to provide the decorative image.

A chromatic colour is any colour in which one particular wavelength or hue predominates. For example, blue and green are chromatic colours, while white, grey, and black are achromatic colours, as they have no dominant hue, meaning that all wavelengths are present in approximately equal amounts within those colours.

In a first aspect of the invention, the base coat (44, 53) contains a pigment for providing a chromatic colour to the base coat. This is illustrated in a simplified manner by FIG. 5, wherein the inkjet printed leather (51) includes a brown dyed crusted leather (52) whereon a base coat (53) is applied that contains a red pigment for providing a red chromatic colour to the base coat. The red colour of the base coat is used in a decorative image, i.e. the face of the 'devil smiley', and combined with white and black UV curable pigmented inkjet inks for providing the other parts of the devil smiley, like the black inkjet printed pupil (54), the black inkjet printed horn (55) and white inkjet printed eye ball (57). Around the devil smiley, a brown inkjet printed background (56) is provided which has a colour, i.e. a brown colour, which is similar to that of the brown dyed crusted leather (52). The red coloured basecoat masks the colour inconsistencies in the surface of the crusted leather, resulting in a colour consistency virtually independent from the leather batch. By using the chromatic colour of the base coat in the decorative image, the amount to be printed of UV curable inkjet ink can be reduced. For example, for reproducing the red colour with a conventional CMYK inkjet ink set, a combination of at least a yellow and a magenta inkjet ink would be required, and perhaps a white inkjet ink for providing a certain brilliance to the red colour. The reduction of deposited UV curable inkjet ink is beneficial for flexibility as thinner ink layers on the leather surface exhibited less cracking upon bending the leather.

Another advantage compared to the above-mentioned GB 2510696 A (SERICOL) is that no image quality, such as sharpness due to bleeding, has to be sacrificed due to the presence of high amounts of organic solvents for reducing the amount of polymerizable compounds forming the ink layer. To maximize this advantage in the invention, preferably no more than 20 wt % of water and/or organic solvents should be included in the pigmented UV curable inkjet inks used.

In a preferred embodiment of the manufacturing method according to the invention, the one or more pigmented UV curable inkjet inks contain 0 to 20 wt %, more preferably no more than 10 wt % of organic solvent or water based on the total weight of the pigmented UV curable inkjet ink. Most preferably, no water and organic solvents are intentionally added to the pigmented UV curable inkjet inks. Sometimes the ink can absorb a small amount of water when hydrophilic compounds are present in the ink.

In a second aspect of the invention, the base coat (44) contains a pigment for providing an achromatic colour different from black to the base coat. In a preferred embodiment, the pigment used for providing the achromatic colour is a white pigment. Black pigments or a combination of pigments that provide a black achromatic colour to the base coat are excluded as they reduce the colour gamut and colour brilliance that can be obtained by the pigmented UV curable inkjet inks. A white basecoat not only masks colour inconsistencies and some surface defects in the surface of the crusted leather, but also increases the colour gamut. The colour gamut represents the number of different colours that can be produced with a certain inkjet ink set. An enlarged colour gamut enhances the luxury effect of leather as photographic image quality can be obtained, and also has economic benefits in that less complex inkjet printers can be used that are printing with an inkjet ink set containing fewer inkjet inks.

Another advantage of including a white pigment in the basecoat is obtained in combination with a dyed crusted leather. The thickness of the white basecoat is generally less than 50 μm or even less than 30 or 20 μm and not viewable by the naked eye from the side of the inkjet printed leather as in FIG. 2. If the crusted leather was dyed to have a certain background colour for the decorative image, then this background colour is no longer viewable as the white base coat is on top of the crusted leather. However, this can be easily restored by inkjet printing a similar colour as background colour on the white basecoat where necessary. Therefore, in a preferred embodiment of the manufacturing method, the surface of the crusted leather and a part of the colour image have a similar colour. A similar colour means that if the dyed crusted leather has a surface with, for example, a black, brown, red, green or blue colour that a part of the inkjet printed colour image also has a colour selected of respectively a black, brown, red, green and blue colour. In a preferred embodiment, the colour difference between the surface of the dyed crusted leather and the corresponding part in the inkjet printed colour image is minimized using ΔE94 as metric.

ΔE94 is a metric for understanding how the human eye perceives colour differences. For a ΔE94≤1.0, no colour difference is perceptible by human eyes. For the present invention, two colours are considered to be similar if the ΔE94 is smaller than 10.0, preferably smaller than 5.0 and most preferably smaller than 2.0.

The calculation of ΔE94 is well known to the skilled person and is, for example discussed in handbooks like Colour Engineering. Edited by GREEN, Phil, et al. John Wiley ans Sons LTD, 2002. ISBN 0471486884. and BERNS, Roy S. Principles of Color Technology. 3rd edition. John Wiley and Sons LTD, 2000.

In a third aspect of the invention, the base coat (44) contains both a pigment for providing a chromatic colour and a pigment for providing an achromatic colour different from black. For example, one could compose a base coat containing a white pigment and one or more colour pigments to provide e.g. an off-white or a pale clay colour necessary in the decorative image. In doing so, a combination of the advantages of the first and second aspect of the invention is obtained to a certain degree, such as an improved flexibility and an enlarged colour gamut.

The base coat applied on the crust leather is required to provide a level of image quality commensurate to the luxury aspect of leather. Natural leather is rather porous, inter alia due to the hairs that have been removed from the hide, and an inkjet ink having low viscosity would penetrate rapidly into the leather resulting in poor image quality.

The decorative image is inkjet printed on the base coat using one or more pigmented inkjet inks. Contrary to most dyes, pigmented inkjet inks guarantee a good light fastness as the leather articles are often used in outdoor conditions. The one or more pigmented inkjet inks are UV curable pigmented inkjet inks, because UV curing rapidly "freezes" the inkjet printed decorative image. The resulting good image quality contributes further to the luxury aspect of the decorated leather article.

For enhancing the scratch resistance, a protective top coat may be applied onto the decorative image and the base coat. However, although a protective top coat is most preferably applied, for certain leather applications it can be omitted, especially since the enhanced flexibility provided by the current invention allows to include a certain amount of polyfunctional monomers and oligomers in the UV curable pigmented inkjet inks. The presence of the polyfunctional monomers enhance the scratch resistance of the inkjet printed leather.

In a preferred embodiment of the manufacturing method, the one or more pigmented UV curable inkjet inks contain 1 to 20 wt % of polyfunctional monomers and oligomers based on the total weight of the pigmented UV curable inkjet ink. Contrary to monofunctional monomers and oligomers containing a single polymerizable group, polyfunctional monomers and oligomers contain two, three or more polymerizable groups. By including polyfunctional monomers, after UV curing a cross-linked polymeric network is obtained that improves scratch resistance.

In a preferred embodiment of the manufacturing method, the crusted leather, the base coat, the decorative image and the top coat are heat pressed. Such a method is known from WO 2013/135828 A (CODUS) to make at least part of the sandwich "base coat/decorative inkjet image/top coat" penetrate and fuse into the leather.

By having a chromatic colour in the base coat, it appears that the colour management becomes more complex for inkjet printing. However, this can be handled by using pre-defined base coat compositions providing a known and measured colour. Alternatively, a base coat can be applied with a certain colour whereof the characteristics are measured and used as input in the colour management software.

The crusted leather is preferably scanned prior to inkjet printing in order to identify printable areas and non-printable areas, such as holes or bite marks.

Decorated Natural Leather and Leather Articles

Figure 3:
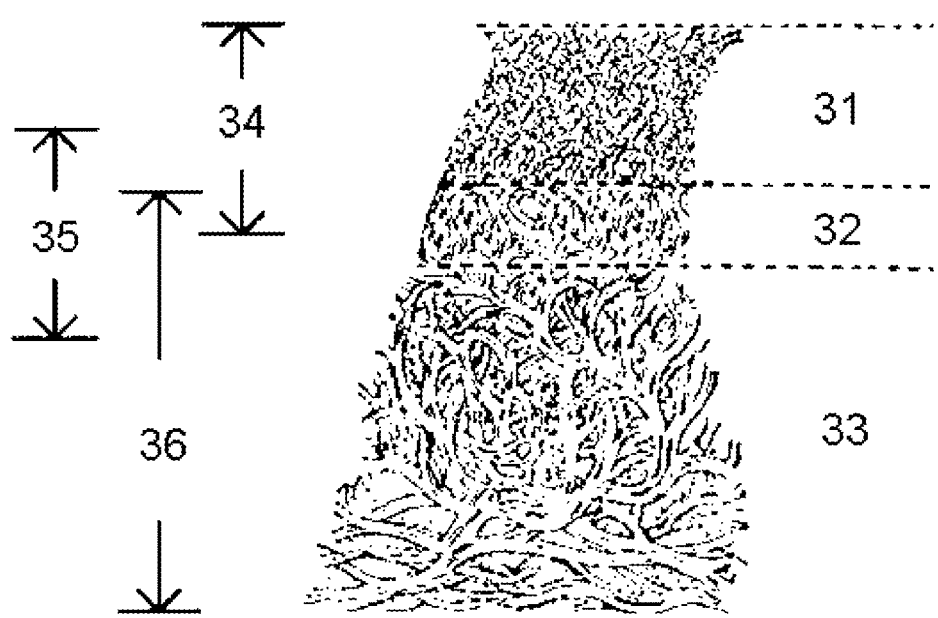
FIG. 3 shows schematically a cross-section of an animal skin including a grain (31) and a corium (33) separated by a junction of grain and corium (32). The different leathers made from the animal skin include full grain leather (34), top grain leather (35) and split leather (36).
Figure 4:
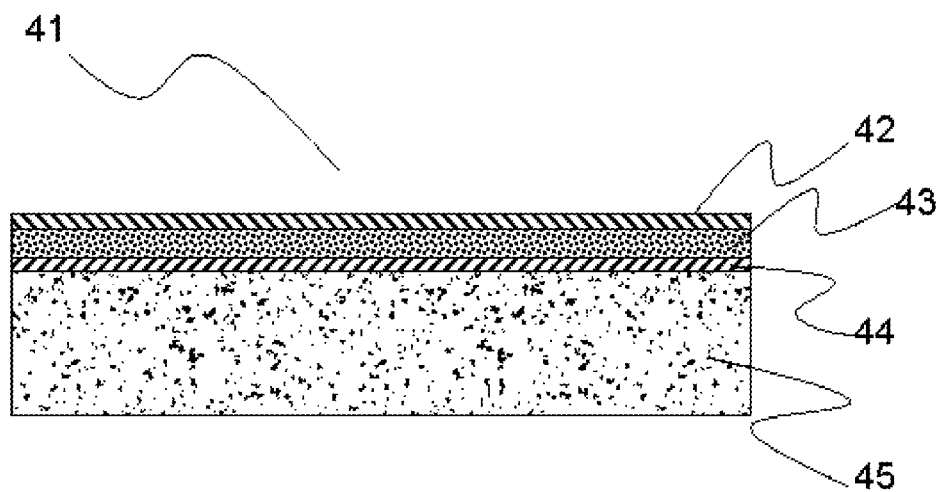
FIG. 4 is a schematical representation of inkjet printed leather (41) including on the crusted leather (45), a base coat (44), the decorative image (43) and a protective top coat (42).

Natural leather comes in different grades (see FIG. 3), such as full grain (34), top grain (35) which is essentially full-grain but with part of the grain layer sanded and the underlying split layer removed, and split leather (36). For the latter, the underlying layer of the cowhide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books, stationary, packaging, equestrian articles, and the like.

Figure 2:
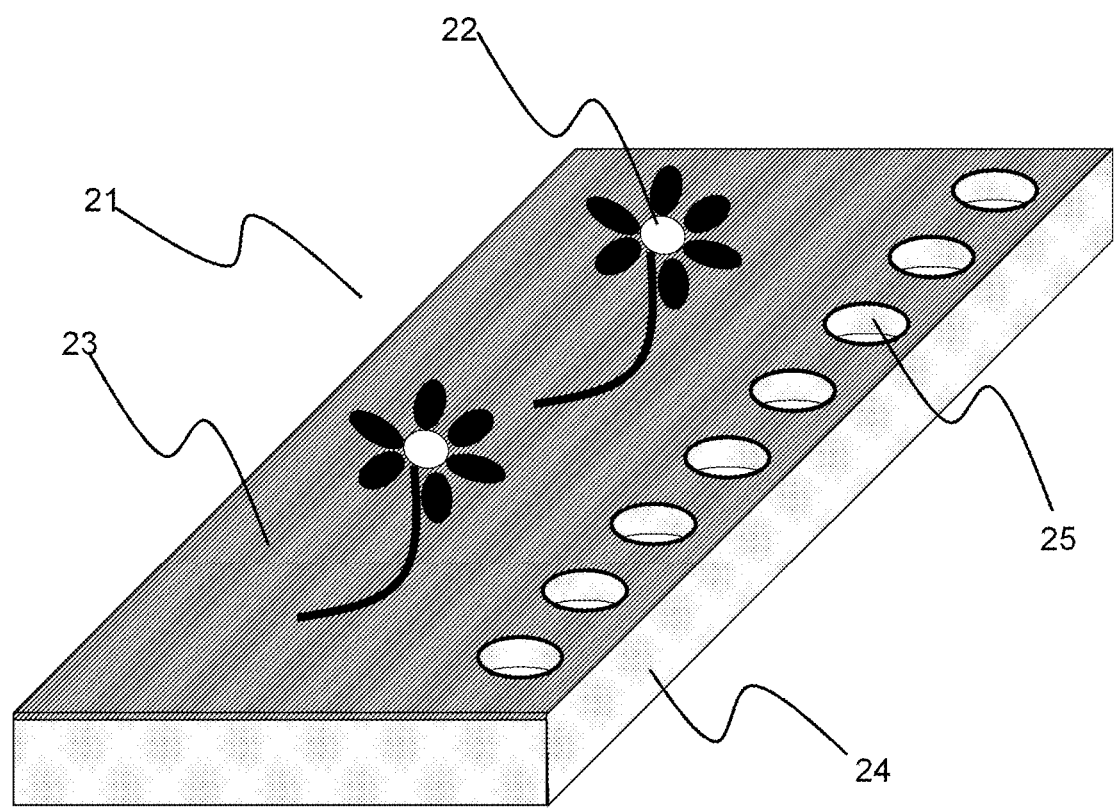
FIG. 2 shows an inkjet printed leather (21) having a decorative image (22) and a background image (23), where the white colour of the leather is clearly visible on a side (24) or in a perforation (25). The background image (23) is a uniform colour, for example a brown background colour if the decorative image is desired to be on a brown handbag.
Figure 5:
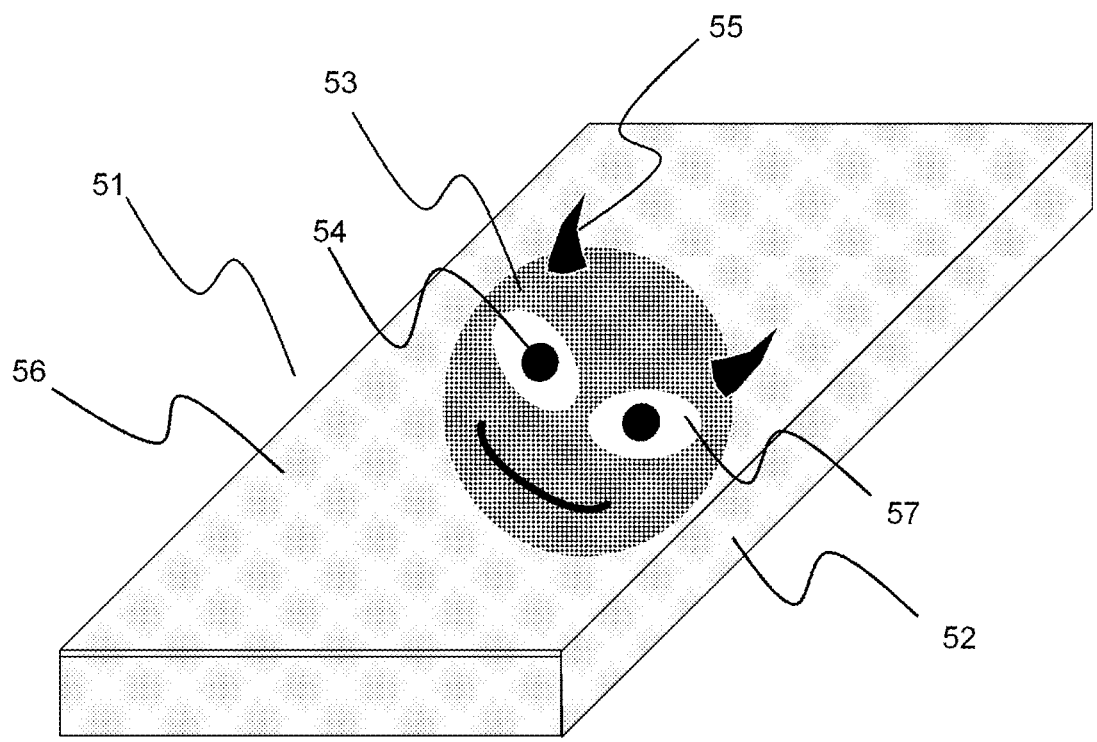
FIG. 5 is a schematical representation of an inkjet printed leather (51) including a red coloured devil smiley on a brown background.

The decorated leather contains a decoration composed of decorative elements, like the flowers in FIG. 2 or the devil smiley in FIG. 5. There is no real limitation on the type of decorative image made by combining an inkjet printed colour image (54, 55, and 57) and the coloured base coat (53).

The decorative image may consist of a single colour or it may include multiple colours such as black, white, cyan, magenta, yellow, red, orange, violet, blue, green and brown.

Base Coats

The base coat applied on the crust leather is required to provide a level of image quality commensurate to the luxury aspect of leather as the low viscosity of inkjet inks lets them penetrate rapidly into the leather resulting in poor image quality.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ.

Suitable polyamides include the PA emulsion types ED310 and 161148 CX from MICHELMAN.

Although polyurethanes and/or polyamides are preferred as the polymers for the base coat, other polymers may be used preferably in combination with the polyurethanes and/or polyamides. Such polymers preferably have an elongation at break of more than 200%, more preferably 300%. The elongation at break is measured according to IS0527-2, for example, with a MTS Exceed™ testing apparatus from MTS Sustems Corporation.

A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred.

The base coat may be applied by spraying or by any coating technique known, such as knife coating, extrusion coating, slide hopper coating and curtain coating.

Pigments are included for providing a chromatic or achromatic colour to the base coat. Both organic and inorganic pigments may be used, although inorganic pigments are preferred because of their light fastness.

As achromatic colours, a white or grey colour may be used. A black colour is excluded as this destroys the colour gamut and usually delivers dull inkjet printed colours. A white colour is obtained by including a white pigment such as titanium dioxide, zinc oxide, calcium carbonate. The white pigment is preferably a pigment with a refractive index greater than 1.60, preferably greater than 2.00, more preferably greater than 2.50 and most preferably greater than 2.60. White pigments may be employed singly or in combination. Preferably, titanium dioxide is used for the pigment with a refractive index greater than 1.60. Titanium dioxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention.

The numeric average particle diameter of the titanium dioxide is preferably at least 200 nm and preferably no more than 1 µm. Sufficient hiding power cannot be obtained when the average diameter is less than 200 nm, and an average diameter exceeding 1 µm tends to change the touch and feel of the leather.

Preferably, an amount of at least 2 g/m$^2$, more preferably at least 4 g/m$^2$ and most preferably at least 6 g/m$^2$ of white pigment, preferably titanium dioxide is used to mask colour inconsistencies and surface defects in the crust leather.

A grey colour can be obtained by adding a black pigment to the white pigment already present in the base coat. Examples of black pigments are carbon blacks, such as the channel black known as Exelsior sold by Columbian Carbon or Superba or other channel or furnace blacks, e.g., Columbian Carbons Raven 11, Raven 15 and Raven 30, or Monsanto's 01 lampblack. The term "grey colour" as used in the present invention refers to a lightness L* that is within 50 to 100%, while the term "black colour" refers to a lightness L* within 0 and 10%. Lightness is an attribute of object colours by which the object appears to reflect or transmit more or less of the incident light. The skilled person in inkjet printing is very familiar with the concept of lightness and CIELAB1976 is used for determining the lightness value L*.

There is no limitation on the colour pigment for producing a chromatic colour of the base coat. For example, brown pigments may be used such as Mapico Brown 422 of Columbian Carbon, or combinations of Red Iron Oxide R 8098 and Yellow Iron Oxide LO 1888B, both supplied by C. K. Williams & Co. Other suitable pigments are DuPonts Phthalocyanine Blue HT 284D, Phthalocyanine Green GT 674D, Monastral Red RT 790D, Chloride White R 900, Monastral Scarlet RT 787D, Harmon Bon Maroon MB 13 and Interchemical Vat Yellow 212896.

There is also no limitation on the amount of colour pigment in the base coat for producing a chromatic colour, as this is determined by the decorative image.

Protective Top Coats

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

For enhancing the scratch resistance, a protective top coat may be applied onto the decorative image and the base coat. The top coat preferably includes a cross-linker and a polymer or copolymer based on polyurethane and/or polyamide.

The protective top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ.

Suitable polyamides include the PA emulsion types ED310 and 161148 CX from MICHELMAN.

Although polyurethanes and/or polyamides are preferred as the polymers for the base coat, other polymers may be used preferably in combination with the polyurethanes and/or polyamides. Such polymers preferably have an elongation at break of more than 200%, more preferably 300%. The elongation at break is measured according to IS0527-2, for example, with a MTS Exceed™ testing apparatus from MTS Systems Corporation.

A suitable polymeric acrylate emulsion is Bioflex™ KGA from LMF Biokimica.

A cross-linker may be incorporated in the protective top coat to improve the scratch resistance. Preferred cross-linkers include those mentioned above for the base coat.

The protective top coat may be applied by spraying or using the same coating techniques as mentioned above for the base coat.

If a matt top surface is desired for the inkjet printed leather, a matting agent may be included. Any suitable matting may be used. Preferred matting agent include silica. A preferred commercially available example of a silica dispersion is Euderm™ SN2 from LANXESS.

UV Curable Pigmented Inkjet Inks

The one or more pigmented inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

A colour pigment may be chosen from those disclosed by HERBST, Willy, et al. Industrial Organic Pigments, Production, Properties, Applications. 3rd edition. Wiley-VCH, 2004. ISBN 3527305769. Suitable colour pigments are disclosed in paragraphs to [0138] of WO 2008/074548 (AGFA GRAPHICS).

In a preferred embodiment, the one or more pigmented inkjet inks form a CMYK(W) or CRYK(W) inkjet ink set.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size of an organic colour pigment and an inorganic black pigment is preferably between 0.050 and 1 µm, more preferably between 0.070 and 0.300 µm and most preferably between 0.080 and 0.200 µm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

A white pigment preferably has a numeric average pigment particle size larger than 180 nm in order to have a strong opacifying capability. Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably, titanium dioxide is used as pigment with a refractive index greater than 1.60. Suitable titanium dioxide pigments are those disclosed in [0117] and in [0118] of WO 2008/074548 (AGFA GRAPHICS).

When using UV curable pigmented inkjet inks, polymerizable compounds and one or more photoinitiators are present in the inkjet ink.

Any polymerizable compound commonly known in the art may be employed. The polymerizable compound may be any monomer or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units. Preferred monomers and oligomers are those listed in [0106] to [0115] in EP 1911814 A (AGFA).

Preferably, a monomer or oligomer capable of free radical polymerization is used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. However preferably an amount of at least 60 to 100 wt % of monofunctional polymerizable compounds is used in the UV curable pigmented inkjet ink with the wt % based on the total weight of the inkjet ink. The viscosity of the radiation curable inkjet inks can be adjusted by varying the amount of specific monomers and oligomers.

In a particularly preferred embodiment of the manufacturing method for decorating leather, the one or more pigmented UV curable inkjet inks contain 1 to 20 wt % of polyfunctional monomers and oligomers based on the total weight of the pigmented UV curable inkjet ink. An upper limit of 20 wt % provides good scratch resistance with impairing flexibility.

The UV curable inkjet ink contains one or more photoinitiators, preferably one or more free radical photoinitiators. A free radical photoinitiator is a chemical compound that initiates polymerization of monomers and oligomers when exposed to actinic radiation by the formation of a free radical.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p.287-294.

In a particularly preferred embodiment, the one or more photoinitiators include an acylphosphine oxide photoinitiator and a thioxanthone photoinitiator. Such a combination allows for fast UV curing with UV LEDS emitting above 370 nm. UV LEDs are more economical in operating the inkjet printing process than mercury lamps.

In order to increase the photosensitivity further, the UV curable inkjet ink may additionally contain co-initiators. Suitable examples of co-initiators can be categorized in three groups: (1) tertiary aliphatic amines, such as methyldiethanolamine and N-methylmorpholine; (2) aromatic amines such as 2-(dimethylamino) ethylbenzoate; and (3) (meth)acrylated amines such as dialkylamino alkyl(meth)acrylates and N-morpholinoalkyl-(meth)acrylates. The preferred co-initiators are aminobenzoates.

A preferred amount of photoinitiator and co-initiator is 0.1-30 wt %, and most preferably 5-15 wt % of the total weight of the UV curable inkjet ink.

The one or more pigmented inkjet inks may contain further additives such as surfactants, polymerization inhibitors and dispersants for the colour pigments.

The preparation of pigmented UV curable inkjet inks is well known to the skilled person. Preferred methods of preparation are disclosed in paragraphs [0076] to [0085] of WO 2011/069943 (AGFA).

Printing Devices

The one or more pigmented inkjet ink are jetted by one or more print heads ejecting small droplets in a controlled manner through nozzles onto natural leather moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so-called through-flow piezoelectric drop-on-demand print head. By using through-flow print heads, the reliability is enhanced and thus a more efficient and economical method of manufacturing high quality decorated natural leather articles is obtained. Such a print head is, for example, available from TOSHIBA TEC as the CF1ou print head.

However the inkjet printing method according to the present invention is not restricted to piezoelectric inkjet printing. Other inkjet print heads can be used and include various types, such as a continuous type print head.

The inkjet print head normally scans back and forth in a transversal direction across the moving leather surface, known as a multi-pass printing mode. Sometimes the inkjet print head does not print on the way back. Bi-directional printing is however preferred for obtaining a high areal throughput.

Another preferred printing method is by a "single pass printing process", which can be performed by using so-called page wide inkjet print heads or multiple staggered inkjet print heads that cover the entire width of the leather surface. In a single pass printing process, the inkjet print heads usually remain stationary and the crust leather is transported under the inkjet print heads.

An advantage of using a multi-pass printing mode is that the UV curable inkjet ink is cured in a consecutive passes, rather than in a single pass which would require a curing device with a high UV output. The print head lifetime is also larger for multi pass printing. While in single pass printing one side shooter is sufficient to replace the whole print head, in multi pass printing side shooters and even failings can be tolerated to a certain level. In addition, the cost of a multi-pass printer is usually much lower, especially for large format crusted leather. Summarizing it can be stated that high image quality can be obtained in a more reliable and economical manner by multi-pass inkjet printing than by single pass printing.

Curing Devices

UV curable based pigmented inkjet inks are cured by ultraviolet radiation. The UV curing device may be arranged in combination with the print head of the inkjet printer, travelling therewith so that the UV curable inkjet ink is exposed to curing radiation very shortly after been jetted. This method of curing is called 'UV-pinning' and helps to provide a high image quality, such as high sharpness. UV-pinning is often followed by a second overall UV curing step, when the UV dose in UV-pinning is insufficient to obtain full cure.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm.

The UV curing and especially UV-pinning is preferably performed using UV LEDs. In a particularly preferred embodiment, the UV curing is performed using UV LEDs having an emission wavelength higher than 370 nm.

UV LEDs have a long lifetime and an almost constant UV dose until the end of life, contrary to e.g. mercury bulbs. Hence, the use of UV LEDs in the inkjet printing process enhances the reliability of the manufacturing method of decorated leather.

For facilitating curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels may be maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified. The water used was demineralized water.

TIO2 is a titanium dioxide pigment available as Tronox™ CR834 from TRONOX PIGMENTS BV.

PB15:4 is an abbreviation used for Hostaperm™ Blue P-BFS, a C.I. Pigment Blue 15:4 pigment from CLARIANT.

MP1 is an abbreviation used for Ink Jet Magenta E7B LV3958, a quinacridone pigment from CLARIANT.

MP2 is an abbreviation used for Chromophtal™ Jet Magenta 2BC, a quinacridone pigment from BASF.

PY150 is a C.I. Pigment Yellow 150 pigment for which Cromophtal yellow LA2 from BASF was used.

PB7 is a carbon black pigment for which Special Black™ 550 from EVONIK was used.

SYN is the dispersion synergist according to Formula (A):

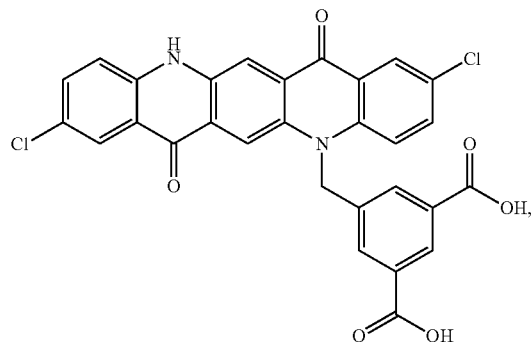

Formula (A)

and was synthesized in the same manner as described in Example 1 of WO 2007/060254 (AGFA GRAPHICS) for the synergist QAD-3.

E7701 is a polyacrylate dispersion agent available as Efka™ 7701 from BASF.

S35000 is an abbreviation used for SOLSPERSE™ 35000, a polyethyleneimine-polyester hyperdispersant from LUBRIZOL.

PEA is 2-phenoxyethyl acrylate available as Sartomer™ SR339C from ARKEMA.

IBOA is isobornylacrylate available as Sartomer™ SR506D from ARKEMA.

IDA is isodecyl acrylate available as Sartomer™ SR395 from ARKEMA.

THFFA is tetrahydrofurfuryl acrylate, available as Sartomer™ SR285 from ARKEMA.

VCL is N-vinyl caprolactam available from BASF BELGIUM, NV.

VEEA is 2-(2'-vinyloxyethoxy)ethyl acrylate, a difunctional monomer available from NIPPON SHOKUBAI, Japan.

DPGDA is dipropylene glycol diacrylate available as Sartomer™ SR508 from ARKEMA.

CN963B80 is a urethane acrylate oligomer available as Sartomer™ CN963B80 from ARKEMA.

CN3755 is an acrylated amine synergist available as Sartomer™ CN 3755 from ARKEMA.

TPO is trimethylbenzoyl diphenyl phosphine oxide supplied as Omnirad™ TPO by IGM.

ITX is Darocur™ ITX is an isomeric mixture of 2- and 4-isopropylthioxanthone from BASF.

BAPO is a bis(2,4,6-trimethylbenzoyl)-phenylphosphineoxide photoinitiator available as Irgacure™ 819 from BASF.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

UV10 is 4-hydroxy-2,2,6,6-tetramethylpiperidinooxy sebacate available as Irgastab™ UV 10 from BASF.

T410 is a silicone surfactant available as Tegoglide™ 410 from EVONIK.

SL7500 is a silicone surfactant available as Silwet™ L7500 from OSI SPECIALITIES BENELUX NV PA is an anionic polyamide dispersion available as Michem™ Emulsion D310 from MICHELMAN PU is a waterbased polyurethane dispersion available as Urepal™ PU147 from CHEMIPAL S.p.A.

XL is a solvent-based aliphatic polyisocyanate available as Urepal™ CT70 from CHEMIPAL S.p.A.

PROMUL is an aqueous polyurethane dispersion available as Melio™ Promul 61 from STAHL.

AFP is an aqueous polyurethane dispersion available as Astacin™ Finish PS from BASF.

BK is a polymeric acrylate emulsion available as Bioflex™ KGA from LMF Biokimica.

EMS is a silica dispersion available as Euderm™ Matt SN2 from LANXESS.

BU is a titanium dioxide paste in water (63% solids) available as Contex™ Bianco Ultra from SAMIA S.p.A.

Measurement Methods

1. Viscosity

The viscosity of the UV curable inkjet inks was measured at 45° C. and at a shear rate of 1,000 $s^{-1}$ using a Rotovisco™ RV1 viscometer from HAAKE.

2. Surface Tension

The static surface tension of the UV curable inkjet inks was measured with a KRÜSS tensiometer K9 from KRÜSS GmbH, Germany at 25° C. after 60 seconds.

3. Average Particle Size

The average particle size (diameter) was determined with a Brookhaven Instruments Particle Sizer BI90plus based upon the principle of dynamic light scattering. The inkjet ink was diluted with ethyl acetate to a pigment concentration of 0.002 wt %. The measurement settings of the BI90plus were: 5 runs at 23° C., angle of 90°, wavelength of 635 nm and graphics=correction function.

4. Flexibility

The flexibility was determined on a SATRA™ STM 701 Bally flexometer wherein samples had to endure a cycle of a multiple of 1,000 flexes. The amount of cracks in the leather after the test determines the score. The cracks are evaluated by the naked eye and by a microscope at a 8× magnification according to a criterion shown in Table 2.

TABLE 2

| Score | Criterion |
|---|---|
| A | No cracks visible by the naked eye or by microscope |
| B | No cracks visible by the naked eye, but some cracks visible by microscope |
| C | Some cracks visible by the naked eye |
| D | Large amount of cracking visible by the naked eye |

5. Masking

The masking capability of the base coat was evaluated on a black dyed crust leather by looking with the naked eye to the surface of the base coat according to a criterion shown in Table 3.

TABLE 3

| Score | Criterion |
|---|---|
| A | Base coat not affected by the black colour of the crust leather and appears as a clean white colour |
| B | Base coat slightly affected by the black colour of the crust leather and appears as a greyish white colour |
| C | Base coat strongly affected by the black colour of the crust leather and appears as a greyish white colour |
| D | Black colour of the crust leather clearly visible |

6. Colour Brilliance

The colour brilliance of in inkjet printed colour image was evaluated on a black dyed crust leather by looking with the naked eye to the surface of the base coat according to a criterion shown in Table 4.

TABLE 4

| Score | Criterion |
|---|---|
| A | Brilliant colours |
| B | Dull colours |
| C | Very dull colours |

Example 1

This comparative example illustrates how a UV curable white inkjet ink cannot provide inkjet printed leather samples exhibiting simultaneously good flexibility and colour brilliance.

Preparation UV Curable White Inkjet Ink Ink-W

A concentrated white pigment dispersion W1 was prepared having a composition according to Table 5.

TABLE 5

| wt % of: | W1 |
|---|---|
| TIO2 | 50.0 |
| E7701 | 4.0 |
| INHIB | 1.0 |
| PEA | 45.0 |

The concentrated white pigment dispersion W1 was prepared by mixing the ingredients of Table 5 for 30 minutes in a vessel equipped with a DISPERLUX™ disperser (from DISPERLUX S.A.R.L., Luxembourg). The polymeric dispersant E7701 was added as a 30% solution in PEA. This mixture was subsequently milled in a DYNO™-MILL ECM Poly from the company WAB Willy A. Bachofen (Switzerland) using 0.40 mm yttrium-stabilized zirconium oxide-beads. The bead mill was filled for 42% with the grinding beads and operated in recirculation mode with a residence time of 10 minutes and using a tip speed of 15 m/s. The milling chamber is water-cooled during the operation.

The concentrated white pigment dispersion W1 was then mixed with the components according to Table 6 to produce a UV curable white inkjet ink Ink-W. The viscosity, surface tension and the average particle size of the white inkjet were determined.

TABLE 6

| wt % of: | Ink-W |
|---|---|
| TIO2 | 16.00 |
| E7701 | 1.28 |

TABLE 6-continued

| wt % of: | Ink-W |
|---|---|
| IBOA | 23.90 |
| VCL | 9.50 |
| VEEA | 5.00 |
| PEA | 26.02 |
| CN963B80 | 5.00 |
| TPO | 6.00 |
| CN3755 | 6.00 |
| INHIB | 1.00 |
| T410 | 0.30 |
| Physical properties | |
| Viscosity at 45° C. | 9.6 mPa · s |
| Surface tension 25° C. | 22.9 mN/m |
| Average particle size | 237 nm |

Preparation of Pigmented UV Curable Inkjet Inks

First concentrated pigment dispersions CPC, CPM1, CPM2, CPY and CPK were prepared. Then these concentrated pigment dispersions were used to prepare a pigmented UV curable inkjet ink set according to Table 12.

Concentrated Cyan Pigment Dispersion CPC

A concentrated pigment dispersion was made by mixing the components according to Table 7 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel. The wt % in Table 7 is based on the total weight of the pigment dispersion.

TABLE 7

| Component | wt % |
|---|---|
| PB15:4 | 16.00 |
| S35000 | 16.00 |
| INHIB | 1.00 |
| DPGDA | 67.00 |

Concentrated Magenta Pigment Dispersion CPM1

The concentrated pigment dispersion CPM1 was prepared in the same manner as described above for the cyan pigment dispersion CPC except that the ingredients used were according to Table 8.

TABLE 8

| Component | wt % |
|---|---|
| MP1 | 15.00 |
| SYN | 0.30 |
| E7701 | 15.00 |
| INHIB | 1.00 |
| PEA | 15.00 |
| DPGDA | 53.70 |

Concentrated Magenta Pigment Dispersion CPM2

The concentrated pigment dispersion CPM2 was prepared in the same manner as described above for the cyan pigment dispersion CPC except that the ingredients used were according to Table 9.

TABLE 9

| Component | wt % |
|---|---|
| MP2 | 16.00 |
| SYN | 0.24 |
| S35000 | 16.00 |
| INHIB | 1.00 |
| PEA | 15.00 |
| DPGDA | 66.76 |

Concentrated Yellow Pigment Dispersion CPY

The concentrated pigment dispersion CPY was prepared in the same manner as described above for the cyan pigment dispersion CPC except that the ingredients used were according to Table 10.

TABLE 10

| Component | wt % |
|---|---|
| PY150 | 16.00 |
| S35000 | 16.00 |
| INHIB | 1.00 |
| DPGDA | 67.00 |

Concentrated Black Pigment Dispersion CPK

The concentrated pigment dispersion CPK was prepared in the same manner as described above for the cyan pigment dispersion CPC except that the ingredients used were according to Table 11.

TABLE 11

| Component | wt % |
|---|---|
| PB7 | 16.00 |
| S35000 | 16.00 |
| INHIB | 1.00 |
| DPGDA | 67.00 |

Pigmented UV Curable Inkjet Ink Set

The UV curable inkjet ink set was prepared using the above prepared concentrated pigment dispersions and combining them with the other components according to Table 12. The wt % is based on the total weight of the inkjet ink.

TABLE 12

| wt % of: | C | Light C | M | Light M | Y | K |
|---|---|---|---|---|---|---|
| PB15:4 | 2.50 | 0.62 | — | — | — | 0.60 |
| MP1 | — | — | 4.00 | 1.00 | — | — |
| MP2 | — | — | — | — | — | 0.30 |
| SYN | — | — | 0.08 | 0.02 | — | 0.01 |
| PY150 | — | — | — | — | 2.45 | — |
| PB7 | — | — | — | — | — | 1.60 |
| E7701 | — | — | 4.00 | 1.00 | 1.63 | — |
| S35000 | 2.50 | 0.62 | — | — | — | 2.50 |
| IBOA | 18.95 | 18.95 | 18.95 | 18.95 | 18.95 | 18.95 |
| VCL | 9.90 | 7.50 | 7.50 | 9.70 | 10.00 | 9.50 |
| PEA | 16.35 | 20.00 | 12.00 | 25.23 | 17.25 | 16.15 |
| THFFA | 14.12 | 13.35 | 15.13 | 5.88 | 13.74 | 12.47 |
| IDA | 5.00 | 5.00 | 5.00 | 5.00 | 5.00 | 5.00 |
| DPGDA | 10.47 | 7.11 | 18.33 | 9.35 | 10.79 | 10.48 |
| CN963B80 | 4.00 | 7.50 | — | 4.50 | 4.00 | 3.00 |
| ITX | 2.00 | 0.50 | 2.95 | 0.50 | 2.00 | 5.00 |
| TPO | 2.95 | 9.95 | 2.95 | 9.95 | 2.95 | 2.95 |
| BAPO | 2.25 | — | 3.50 | — | 2.25 | 2.00 |
| CN3755 | 7.50 | 7.50 | 4.00 | 7.50 | 7.50 | 8.00 |
| INHIB | 0.16 | 0.04 | 0.27 | 0.07 | 0.14 | 0.15 |

TABLE 12-continued

| wt % of: | C | Light C | M | Light M | Y | K |
|---|---|---|---|---|---|---|
| UV10 | 0.35 | 0.35 | 0.35 | 0.35 | 0.35 | 0.35 |
| SL7500 | 1.00 | 1.00 | 1.00 | 1.00 | 1.00 | 1.00 |

Light cyan and Light magenta inkjet inks were included in the ink set to further enhance the image quality. Light inks reduce graininess in the inkjet printed image when low density colours are present in the image.

The inkjet inks exhibited the following properties according to Table 13.

TABLE 13

| Physical property | C | Light C | M | Light M | Y | K |
|---|---|---|---|---|---|---|
| Viscosity (45° C.) | 9.6 | 9.9 | 10.9 | 10.2 | 10.1 | 10.2 |
| Surface tension (mN/m) | 30.6 | 29.2 | 27.9 | 29.6 | 28.6 | 29.7 |
| Average particle size (nm) | 129 | 147 | 169 | 175 | 191 | 123 |

Preparation of Base Coat BC1

A base coat BC1 was prepared by mixing the following ingredients according to Table 14.

TABLE 14

| wt % of: | BC1 |
|---|---|
| PA | 20.0 |
| PU | 10.0 |
| XL | 0.9 |
| Water | 69.1 |

Preparation of Protective Top Coat TC1

A protective top coat TC1 was prepared by mixing the following ingredients according to Table 15.

TABLE 15

| wt % of: | TC1 |
|---|---|
| PA | 20.0 |
| PU | 50.0 |
| XL | 2.0 |
| Water | 28.0 |

Evaluation and Results

Inkjet printed leather samples LS1 to LS3 were prepared in the following manner.

First, a base coat BC1 was applied on a black dyed chrome tanned calfskin leather from the Nuti Ivo group using a Starlab™ 800 roller coater from GEMATA set up with a 30F coating and lacquering roll. The coated leather was dried using a Radicure™ D dryer set to a temperature of 280° C. wherein the speed of the conveyor belt is set to the lowest value resulting in a drying time of 2.5 min.

A white inkjet ink layer was printed at different thicknesses as shown in Table 16.

A colour image was printed using a Jeti™ Titan from Agfa Graphics using the above UV curable white inkjet ink and pigmented UV curable inkjet inks. The average thickness of the layer was estimated to be about 15 μm.

After inkjet printing, a protective top coat TC1 was applied on the inkjet printed image in the same manner as the application of the base coat BC1 was performed.

Finally, the leather samples were heat pressed in a Secabo™ TPD12 pneumatic transfer press at a temperature of 175° C. and a pressure of 4 bar for 35 seconds.

The opacity, flexibility and colour brilliance was evaluated of the inkjet printed leather samples LS1 to LS3. The results are shown in Table 16.

TABLE 16

| Sample | Thickness White ink layer | Masking | Flexibility (20,000 flexes) | Colour brilliance |
|---|---|---|---|---|
| LS1 | 7 μm | C | B | C |
| LS2 | 14 μm | B | C | B |
| LS3 | 21 μm | A | D | A |

From Table 16, it should be clear that there is a trade-off between image quality and flexibility.

Example 2

This example illustrates the manufacturing method for decorating natural leather with a decorative image according to the invention wherein the base coat contains a pigment providing an achromatic colour different from black to the base coat applied on a dyed crusted leather.

Preparation of Base Coat BC2

A base coat BC2 was prepared by mixing the following ingredients according to Table 17.

TABLE 17

| wt % of: | BC2 |
|---|---|
| PA | 12.66 |
| PU | 6.33 |
| XL | 0.58 |
| APS | 14.93 |
| PROMUL | 14.93 |
| BK | 26.13 |
| EMS | 7.46 |
| BU | 16.98 |

Evaluation and Results

The same UV curable inkjet ink set and protective topcoat TC1 of Example 1 were used to manufacture a decorative leather sample LS4.

In the same manner as in Example 1, three coating layers of the base coat BC2 were applied onto the black dyed chrome tanned calfskin leather from the Nuti Ivo group using a Starlab™ 800 roller coater from GEMATA and the Radicure™ D dryer set to a temperature of 280° C. wherein the speed of the conveyor belt is set to the lowest value resulting in a drying time of 2.5 min. The same colour image as in Example 1 was printed using a Jeti™ Titan from Agfa Graphics in exactly the same manner using the above UV curable pigmented UV curable inkjet inks, but no white inkjet ink.

After inkjet printing, a protective top coat TC1 was applied on the inkjet printed image in exactly the same manner as in Example 1.

Finally, the leather sample were heat pressed in a Secabo™ TPD12 pneumatic transfer press at a temperature of 175° C. and a pressure of 4 bar for 35 seconds.

A SEM analysis on the leather sample LS4 was performed to determine that the dry thickness of the base coat was 20 μm.

The masking, flexibility and colour brilliance were evaluated on the inkjet printed leather samples LS4 in the same manner as in Example 1. The results are shown in Table 18.

TABLE 18

| Sample | Thickness White base coat | Masking | Flexibility (20,000 flexes) | Colour brilliance |
|---|---|---|---|---|
| LS4 | 20 μm | A | A | A |

From the results in Table 18, it is immediately clear that high image quality was obtained without sacrificing flexibility.

Example 3

This example illustrates the manufacturing method for decorating natural leather with a decorative image according to the invention wherein the base coat contains a pigment providing a chromatic colour to the base coat applied on a chrome tanned 'wet blue' leather.

Preparation of Base Coat BC3

A base coat BC3 was prepared in the same manner as in Example 2, by replacing a minor part of the titanium dioxide pigment BK in the base coat BC2 by a brown pigment.

Evaluation and Results

The same UV curable inkjet ink set and protective topcoat TC1 of Example 1 were used to manufacture a decorative leather sample LS5.

The base oat BC3 was spray coated to a thickness of about 70 g/m² onto a chrome tanned leather (Nuti™ Blue Leather) from the Nuti Ivo group and subsequently dried by Radicure™ D dryer set to a temperature of 280° C. wherein the speed of the conveyor belt is set to the lowest value resulting in a drying time of 2.5 min. A very smooth, uniform coating was obtained having an off-white, pale yellow colour (clay colour).

A colour image including dark red and blue stripes was printed using a Jeti™ Titan from Agfa Graphics using the above UV curable pigmented UV curable inkjet inks, wherein the clay colour of the base coat was integrated in the decorative image between the dark red and blue stripes.

After inkjet printing, a protective top coat TC1 was applied on the inkjet printed image in exactly the same manner as in Example 1.

Finally, the leather sample were heat pressed in a Secabo™ TPD12 pneumatic transfer press at a temperature of 73° C. and a pressure of 4 bar for 3 seconds.

The masking, flexibility and colour brilliance were evaluated on the inkjet printed leather samples LS5. The results are shown in Table 19.

TABLE 19

| Sample | Masking | Flexibility (20,000 flexes) | Colour brilliance |
|---|---|---|---|
| LS5 | A | A | A |

From the results in Table 19, it is immediately clear that high image quality was obtained without sacrificing flexibility.

REFERENCE SIGNS LIST

TABLE 20

| | |
|---|---|
| 21 | Inkjet printed leather |
| 22 | Decorative image |
| 23 | Background image |
| 24 | White leather side |
| 25 | White leather perforation |
| 31 | Grain |
| 32 | Junction of grain and corium |
| 33 | Corium |
| 34 | Full grain leather |
| 35 | Top grain leather |
| 36 | Split leather |
| 41 | Inkjet printed leather |
| 42 | Protective topcoat |
| 43 | Inkjet printed image |
| 44 | Base coat |
| 45 | Dyed crusted leather |
| 51 | Inkjet printed leather |
| 52 | Brown dyed crusted leather |
| 53 | Red unprinted base coat |
| 54 | Black inkjet printed pupil |
| 55 | Black inkjet printed horn |
| 56 | Brown inkjet printed background |
| 57 | White inkjet printed eye ball |

The invention claimed is:

1. A manufacturing method for decorating natural leather with a decorative image, the method comprising:
   applying on a crusted leather a base coat including a pigment that provides an achromatic color different from black;
   inkjet printing a color image on the base coat using one or more pigmented UV curable inkjet inks;
   applying a protective top coat on the color image; and
   applying a heat pressing step; wherein
   the achromatic color different from black in the base coat and the inkjet printed color image in combination define the decorative image;
   the pigment used for providing the achromatic color is a white pigment;
   the base coat includes a polymer or copolymer based on polyurethane; and
   the crusted leather, the base coat, the color image, and the protective top coat are heat pressed.

2. The manufacturing method according to claim 1, wherein the crusted leather is dyed.

3. The manufacturing method according to claim 1, wherein a surface of the crusted leather and a portion of the color image have a similar color.

4. The manufacturing method according to claim 1, wherein the one or more pigmented UV curable inkjet inks include 1 to 20 wt % of polyfunctional monomers or oligomers based on a total weight of the one or more pigmented UV curable inkjet inks.

5. The manufacturing method according to claim 1, wherein the one or more pigmented UV curable inkjet inks include 0 to 20 wt % of organic solvent or water based on a total weight of the one or more pigmented UV curable inkjet inks.

6. The manufacturing method according to claim 1, wherein the protective top coat includes a polymer or copolymer based on polyurethane.

7. A decorated natural leather including a decorative image and comprising, in order:
   a crusted leather;
   a base coat including a pigment that provides an achromatic color different from black;
   a pigmented UV curable inkjet printed color image; and
   a protective top coat; wherein
   the achromatic color different from black in the base coat and the inkjet printed color image in combination define the decorative image;
   the pigment used for providing the achromatic color is a white pigment;
   the base coat includes a polymer or copolymer based on polyurethane; and
   the decorated natural leather is embossed.

8. The decorated natural leather according to claim 7, wherein the crusted leather is dyed.

9. The decorated natural leather according to claim 8, wherein a surface of the crusted leather and a portion of the color image have a similar color.

10. A leather article comprising:
    the decorated natural leather according to claim 7; wherein
    the leather article is selected from the group consisting of footwear, furniture, upholstery, bags, luggage, gloves, belts, wallets, clothing, automotive leather seats, interior decoration, packaging, equestrian leather articles, books, and stationary.

11. The manufacturing method according to claim 6, wherein the decorative natural leather is embossed.

* * * * *